(12) United States Patent
Mao et al.

(10) Patent No.: US 11,948,001 B2
(45) Date of Patent: Apr. 2, 2024

(54) ADAPTIVE CPU USAGE MECHANISM FOR NETWORKING SYSTEM IN A VIRTUAL ENVIRONMENT

(71) Applicant: SONICWALL INC., Milpitas, CA (US)

(72) Inventors: Miao Mao, Shanghai (CH); Wei Zhou, Shanghai (CH); Zhong Chen, Shanghai (CH)

(73) Assignee: SONICWALL INC., Milpitas, CA (US)

( * ) Notice: Subject to any disclaimer, the term of this patent is extended or adjusted under 35 U.S.C. 154(b) by 42 days.

(21) Appl. No.: 17/350,239

(22) Filed: Jun. 17, 2021

(65) Prior Publication Data

US 2021/0397475 A1 Dec. 23, 2021

Related U.S. Application Data

(60) Provisional application No. 63/041,003, filed on Jun. 18, 2020.

(51) Int. Cl.
*G06F 9/48* (2006.01)
*G06F 9/455* (2018.01)
*G06F 9/46* (2006.01)
*G06F 9/50* (2006.01)

(52) U.S. Cl.
CPC ............ *G06F 9/4881* (2013.01); *G06F 9/455* (2013.01); *G06F 9/46* (2013.01); *G06F 9/461* (2013.01); *G06F 9/466* (2013.01); *G06F 9/48* (2013.01); *G06F 9/4806* (2013.01); *G06F 9/4843* (2013.01); *G06F 9/485* (2013.01); *G06F 9/4887* (2013.01); *G06F 9/50* (2013.01);
(Continued)

(58) Field of Classification Search
CPC ........ G06F 9/455; G06F 9/45508; G06F 9/48; G06F 9/4806; G06F 9/4843; G06F 9/485; G06F 9/4881; G06F 9/4887; G06F 9/50; G06F 9/5005; G06F 9/5022; G06F 9/5027; G06F 9/505
See application file for complete search history.

(56) References Cited

U.S. PATENT DOCUMENTS

2009/0049451 A1\* 2/2009 Bates ...................... G06F 9/461
718/108
2013/0132711 A1\* 5/2013 Shah ...................... G06F 9/461
712/228
(Continued)

*Primary Examiner* — Charles M Swift
(74) *Attorney, Agent, or Firm* — Polsinelli LLP

(57) ABSTRACT

Methods and apparatus consistent with the present disclosure may be used in environments where multiple different virtual sets of program instructions are executed by shared computing resources. These methods may allow actions associated with a first set of virtual software to be paused to allow a second set of virtual software to be executed by the shared computing resources. In certain instances, methods and apparatus consistent with the present disclosure may manage the operation of one or more sets of virtual software at a point in time. Apparatus consistent with the present disclosure may include a memory and one or more processors that execute instructions out of the memory. At certain points in time, a processors of a computing system may pause a virtual process while allowing instructions associated with another virtual process to be executed.

20 Claims, 5 Drawing Sheets

(52) U.S. Cl.
CPC .......... *G06F 9/5005* (2013.01); *G06F 9/5022* (2013.01); *G06F 9/5027* (2013.01); *G06F 9/505* (2013.01)

(56) References Cited

U.S. PATENT DOCUMENTS

| | | | |
|---|---|---|---|
| 2014/0022901 A1* | 1/2014 | Suzuki | H04L 47/266 |
| | | | 370/235 |
| 2016/0224373 A1* | 8/2016 | Harris | G06F 9/5027 |
| 2016/0275025 A1* | 9/2016 | Accapadi | G06F 9/4881 |
| 2017/0221173 A1* | 8/2017 | Acharya | G06F 9/4843 |
| 2017/0249152 A1* | 8/2017 | Cuadra | G06F 9/3848 |
| 2018/0212886 A1* | 7/2018 | Contavalli | H04L 47/225 |
| 2020/0026561 A1* | 1/2020 | Slinger | G06F 9/4881 |

* cited by examiner

ADAPTIVE CPU USAGE MECHANISM FOR NETWORKING SYSTEM IN A VIRTUAL ENVIRONMENT

CROSS REFERENCE TO RELATED APPLICATIONS

The Present Application claims the priority benefit of U.S. provisional application 63/041,003 filed Jun. 18, 2020, the disclosure of which is incorporated herein by reference.

BACKGROUND OF THE INVENTION

Field of Invention

The present disclosure generally relates to increasing the efficiency of a processing data. More specifically, the present disclosure relates to managing the processing of data in a virtual computing environment.

Description of the Related Art

Every day computers process data received from other computers as a normal course of business. Typically data is passed from computer to computer via a computer network in the form of data packets. After a computer receives a data packet from another computer, the received data packet must be processed. Software that processes packets often executes instructions that causes a processor to continuously poll or check to see if data packets have been received. In certain instances, this polling process causes a processor or processing core to perform packet processing tasks (such as checking to see if a packet has been received) even when no data packets have been received. This can result in a processor wasting processing cycles by executing instructions at a maximum processing speed without accomplishing any task that is useful.

Furthermore, today there is a growing trend to design and build computer programs that are 'virtualized.' While instructions in a set of virtualized of software may be executed by physical processing hardware, a given set of virtualized software is abstracted from actual computing resources. In certain instances, instructions included in a single set of virtualized software may be executed by different types of processors. To accomplish this, a set of virtualized software may pass data to other software processes that are designed to operate on a particular type of processor via a programming interface. This means that virtualized software may be designed to use specific interfaces (e.g. an application programming interface—API) to communicate with other software processes that are hardware aware. Because of this, it may be possible for a set of virtual software to be run on a processor compatible with the Intel processing architecture or on a processor of another architecture (e.g. the ARM processing architecture), for example.

In such environments, it would be beneficial to be able to execute instructions from multiple different sets of virtual processing software on a same set of shared processing hardware. Conventional forms of software that are hardware aware can partition tasks to individual pieces of hardware. For example, an Intel processor that includes multiple different processing cores can be configured to execute a first set of instructions on a first processing core and can be configured to execute a second set of instructions on a second processing core. In such an instance, the first processing core may execute instructions associated with a first computer process and the second processing core may execute instructions with a second computer process. Since virtualized sets of software instructions are not hardware aware, they cannot partition processing tasks based on a hardware architecture, instead other techniques must be used such that different sets of virtualized software instructions can be executed in a fashion that appears as if each of the different sets of virtual software were operating at a same time.

As reviewed above, conventional data packet processing tasks are performed by a processor that executes instructions in a loop, where the processor continuously polls to see if a new data packet has been received. Other processing tasks, for example like those that are directed to processing commands (i.e. command plane processing tasks) are commonly interrupt driven. Interrupt driven processing tasks commonly require contextual information to be updated or setup before a process associated with that interrupt driven processing task can be performed. This updating or setting up of contextual data is commonly referred to as a context switch, where each context switch requires a processor execute instructions that in themselves may not perform work that is useful (real work). Because of this, the context switch associated with interrupt driven software processes have an overhead. This overhead may make it impractical or inefficient to perform frequency processing tasks, such as packet processing tasks, using interrupts. This is especially true when a particular computing device is dedicated to process large numbers of packets because each packet processing task would be delayed by the time required to perform a context switch. The same can be true of other types of processing tasks. Simply put, in certain instances, polling can be a preferred way to perform processing tasks of a type that must be processed continuously (as in the case of high frequency "data plane" processing applications) and interrupt driven processing can be a preferred way to perform processing tasks that occur relatively infrequently. In a virtual programming environment, however, both polling and interrupt driven processing methodologies suffer from limitations that may make it difficult or inefficient to perform without excessive overhead. This may especially be true when multiple different sets of virtual programming tasks are performed at what appears to be the same time. What are needed are new ways to share available hardware processing resources by different virtualized sets of software.

SUMMARY OF THE CLAIMED INVENTION

The presently claimed invention relates to a method, a non-transitory computer readable storage medium, and an apparatus that my execute functions consistent with the present disclosure. A method consistent with the present disclosure may include setting a first sleep timer to an initial value that identifies a first time that a first virtual process will be paused. During the time that the first virtual process is paused, the processor may execute instructions associated with at least one other process. The processor may then execute instructions associated with the first virtual process after identifying that the first sleep timer corresponds to a zero value. Next, a number of processing tasks may be identified as meeting or exceeding a threshold number and a time may be allocated for processing tasks associated with the first virtual process based on a time difference. The allocated time may be greater when the time difference is less than or equal to the first time setting and the allocated time may be less when the time difference is greater than the first time setting. After the time is allocated, one or more tasks associated with the first virtual process may be processed for a time span not exceeding the allocated time.

When the presently claimed invention is implemented as a non-transitory computer-readable storage medium a processor may implement a method consistent with the present disclosure. This method may include setting a first sleep timer to an initial value that identifies a first time that a first virtual process will be paused. During the time that the first virtual process is paused, the processor may execute instructions associated with at least one other process. The processor may then execute instructions associated with the first virtual process after identifying that the first sleep timer corresponds to a zero value. Next, a number of processing tasks may be identified as meeting or exceeding a threshold number and a time may be allocated for processing tasks associated with the first virtual process based on a time difference. The allocated time may be greater when the time difference is less than or equal to the first time setting and the allocated time may be less when the time difference is greater than the first time setting. After the time is allocated, one or more tasks associated with the first virtual process may be processed for a time span not exceeding the allocated time.

An apparatus consistent with the present disclosure may include a memory and a processor that executes instructions out of the memory. Here again, the processor may execute instructions to set a first sleep timer to an initial value that identifies a first time that a first virtual process will be paused. During the time that the first virtual process is paused, the processor may execute instructions associated with at least one other process. The processor may then execute instructions associated with the first virtual process after identifying that the first sleep timer corresponds to a zero value. Next, a number of processing tasks may be identified as meeting or exceeding a threshold number and a time may be allocated for processing tasks associated with the first virtual process based on a time difference. The allocated time may be greater when the time difference is less than or equal to the first time setting and the allocated time may be less when the time difference is greater than the first time setting. After the time is allocated, one or more tasks associated with the first virtual process may be processed for a time span not exceeding the allocated time.

DETAILED DESCRIPTION

Methods and apparatus consistent with the present disclosure may be used in environments where multiple different virtual sets of program instructions are executed by shared computing resources. These methods may allow actions associated with a first set of virtual software to be paused to allow a second set of virtual software to be executed by the shared computing resources. In certain instances, methods and apparatus consistent with the present disclosure may manage the operation of one or more sets of virtual software at a point in time. Apparatus consistent with the present disclosure may include a memory and one or more processors that execute instructions out of the memory. At certain points in time, the processors of a computing system may pause a virtual process using a sleep command while allowing instructions associated with another virtual process to be executed.

The present disclosure is directed to using hardware resources in a manner that does not result in a processor constantly executing instructions when there are no available processing tasks (when there is no "real work") for the processor to perform. Instructions may be identified as being "real work" when a processor executes instructions that perform a packet processing function, that manipulate data, or that performs calculations using data. Instructions associated with other functions that may not be considered "real work" include polling to see if a data packet has been received when a data packet has not been received or may include instructions associated with the switching of contextual information.

Many computers that access the Internet today are located within a private computer network or private "Intranet." Computers that reside within such private networks are often protected from malicious program code (e.g. computer viruses, spam, or spyware) by computing devices that are commonly referred to as gateways or firewalls. When a computer within a computer network attempts to access the Internet, an access request will commonly be passed through a gateway. After a gateway receives an access request from a computer within a private network, it will typically receive data packets from another computer that may reside outside of the private network. After the gateway receives data packets, it may process those data packets. This processing may include scanning for viruses or spyware, deep packet inspection (DPI) scanning, or other tests that are designed to protect computers within a private network from being exploited by malware. While gateways or firewalls may benefit from techniques consistent with the present disclosure, these techniques are not limited to gateways or firewalls. Methods consistent with the present disclosure may be implemented to modulate how long a particular virtual processing task is allowed to execute based on historical timing or other information.

Figure 1:
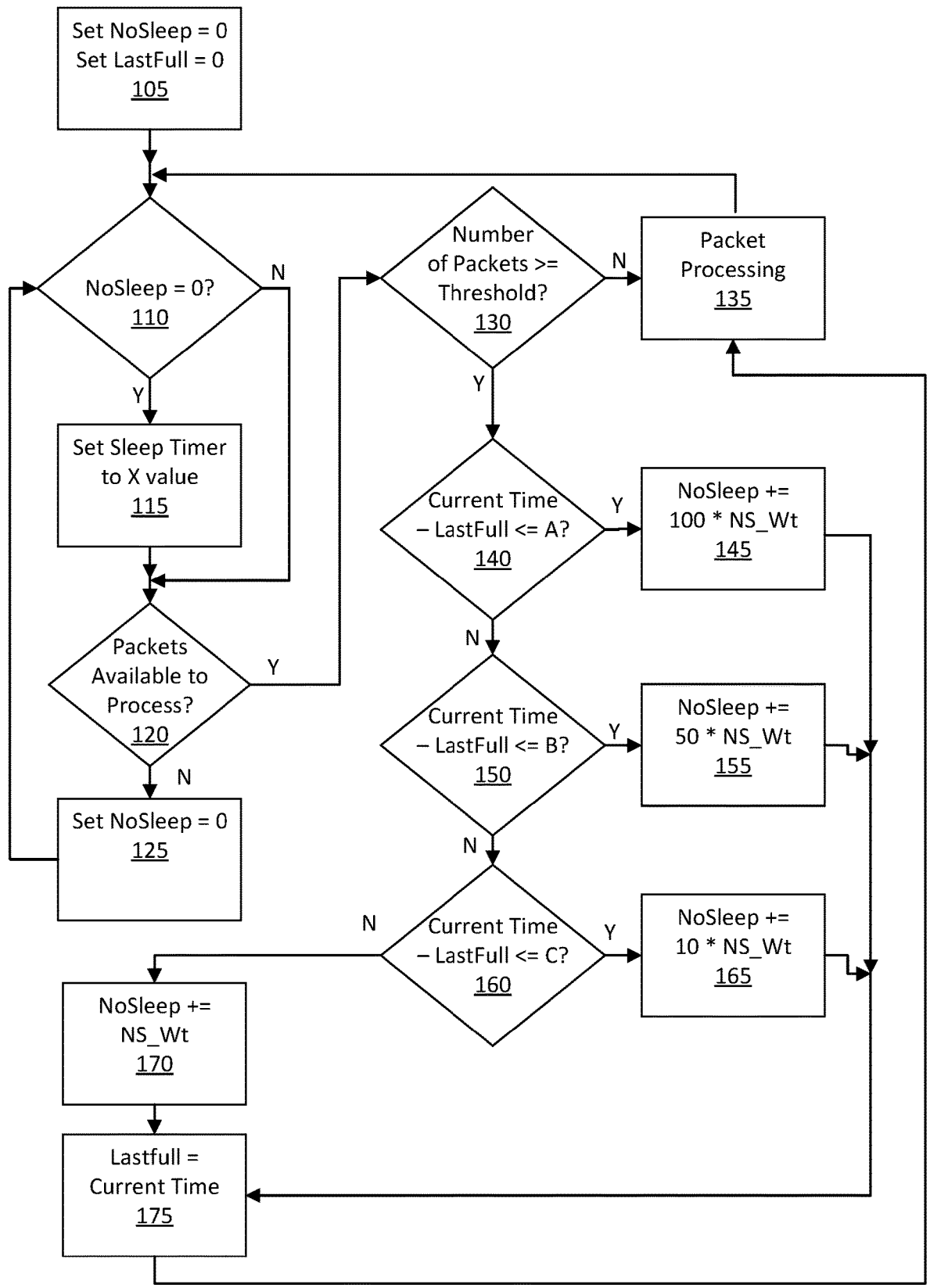
FIG. 1 illustrates a series of steps that modify how long a virtual processes is paused as data packets receipt rates change over time.

FIG. 1 illustrates a series of steps that modify how long a virtual processes is paused as data packets receipt rates change over time. FIG. 1 begins with a first step 105 where variables "no-sleep" and "last-full" are both set to a value of zero. The no-sleep variable may be used to identify a time that instructions associated with a first virtual process are executed by processor. The last-full variable may correspond to a time when instructions associated with the first virtual process were last executed by the processor. Alternatively the last-full variable may correspond to a time when a task buffer was filled to at least a threshold level. Determination step 110 identifies whether the value of no-sleep is currently set to zero, when yes program flow moves to step 115 where a sleep timer is set to a value of X. When determination step 110 identifies that that value of no-sleep is currently not zero or after step 115, program flow moves to determination step 120. Determination step 120 identifies whether packets are available to process. This determination may be made based on identifying whether a packet buffer currently stores received data packets. In certain instances, a pointer or a counter may be used to track a number of packets that are waiting to be processed. When determination step 120 identifies that that are no current packets to process, program flow may move to step 125 where no-sleep is once again set to zero and program flow may then move back to determination step 110. Note that as long as no new data packets are received, program flow will stay in a loop that tests to see whether new data packets have been received, where each time the loop is traversed, the virtual process of FIG. 1 will be put to sleep for a time of "X" that could be on the order of a number of microseconds, for example. Alternatively, the value of "X" may correspond to a number of processor clock cycles, instead of an absolute time. In certain instances, each clock cycle may result in a counter being decremented or incremented.

When determination step 120 identifies that data packets are available to be processed, program flow may move to determination step 130, where a number of data packets stored in an input buffer may be compared to a threshold number. When determination step 130 identifies that the number of packets stored in the buffer are not greater than or equal to a threshold number, program flow may move to step 135, where some or all of the stored packets are processed: at this time, a no-sleep timer may be set to a nominal value that allows at least some of the stored packets to be processed. When determination step 130 identifies that the number of stored packets equals or is greater than the threshold number, program flow moves to determination step 140 that identifies whether a current time (or timer value) minus a "last-full" value is less than or equal to a time of "A" according to the formula [(current time value)−(last full value)<=(A)]. Here again measures of time may be tracked based on a number of processor clock cycles. When determination step 140 identifies that the current time value minus the last-full value is less than or equal to A, program flow may move to step 145 where a value of no-sleep may be set to a current no-sleep value plus one hundred times a no-sleep weighting factor (NS_Wt) according to the formula: set no-sleep to a value of [(a current no-sleep value)+(100*NS_Wt)]. This may result in a larger no-sleep value being assigned when the time difference is lower. As such, larger no-sleep values may be increase as a data packet receipt rate increases.

When determination step 140 identifies that the current time value minus the last full value is not less than or equal to a value of A, program flow may move to determination step 150, that identifies whether a current time or timer value minus a "last-full" value is less than a time of "B." In certain instances, time A may be less than time B. When determination step 150 identifies that the current time value minus the last full value is less than or equal to B, program flow may move to step 155 where a value of no-sleep may be set to a current no-sleep value plus fifty times a no-sleep weighting factor (NS_Wt) according to the formula: set no-sleep to a value of [(a current no-sleep value)+(50*NS_Wt)].

When determination step 150 identifies that the current time value minus the last full value is not less than or equal to a value of B, program flow may move to determination step 160, that identifies whether a current time or timer value minus a "last-full" value is less than or equal to a time of "C." In certain instances, time B may be less than time C and time A may be less than time B & C. When determination step 160 identifies that the current time value minus the last full value is less than or equal to C, program flow may move to step 165 where a value of no-sleep may be set to a current no-sleep value plus ten times a no-sleep weighting factor (NS_Wt) according to the formula: set no-sleep to a value of [(a current no sleep value)+(10*NS_Wt)].

When determination step 160 identifies that the current time value minus the last full-value is not less than or equal to a value of C, program flow may move to step 170 that sets the no sleep value to the no sleep weighting factor (NS_Wt) value or time. FIG. 1 illustrates that after each of steps 145, 155, 165, or 170 that program flow moves to step 175 that sets a "last-full" value to a current time value. As noted above, these time values may be set in time or may be set to a number of processor clock cycles. Furthermore, in certain instances, a last-full value may be associated with a time that data packets were last processed or may be associated with a time when a data packet buffer is filled to at least a threshold level. After step 175, program flow may move to step 135 where the packets are processed for at least a time that corresponds to the current "no sleep" value. As discussed above after step 135, program flow may move back to determination step 110 that identifies whether the no sleep value is set to zero, where program flow may move back to determination step 120 without setting the sleep timer. Alternatively, program flow may move to step 115 where the sleep timer is set before moving to step 120.

Processes consistent with the present disclosure may vary allocated processing times based on time differences that may indirectly correspond to a number of processing tasks that are available to be performed. In instances when data packets are being received relatively quickly, assigned no-sleep times will be larger. Because of this, actions of step 145 may be performed only in instances when a number of packets that are waiting to be processed is equal to a relatively higher number. Note also that actions of step 155, 165, and 170 may be performed in instances where the number of packets that are waiting to be processed corresponds to a relatively lower number of packets as compared to step 145. Since each of determination steps 140, 150, and 160 compare a current time to a last-full (or last processed) time value, a current last time value will affect how much time the virtual process does not sleep. Because of this, the difference between a current time value and a current last full time value may affect how much time the processor will be allowed to process packets in a given iteration. When the current time minus the last time is lower, a larger value of no sleep time may be set and when the current time minus the last-full time is larger, a lower value of no sleep time may be set. While not illustrated in FIG. 1 step 135 may process packets until all of the packets in a packet buffer are processed or may process packets until the no sleep time decrements to zero. As such, packet processing step 135 may also decrement the no sleep time as packets are processed.

Alternatively, determination steps 140, 150, & 160 man identify a number of data packets stored in an input buffer and times set in steps 145, 155, and 165 may be directly based on the number of packets identified in steps 140, 150, and 160.

Figure 2:
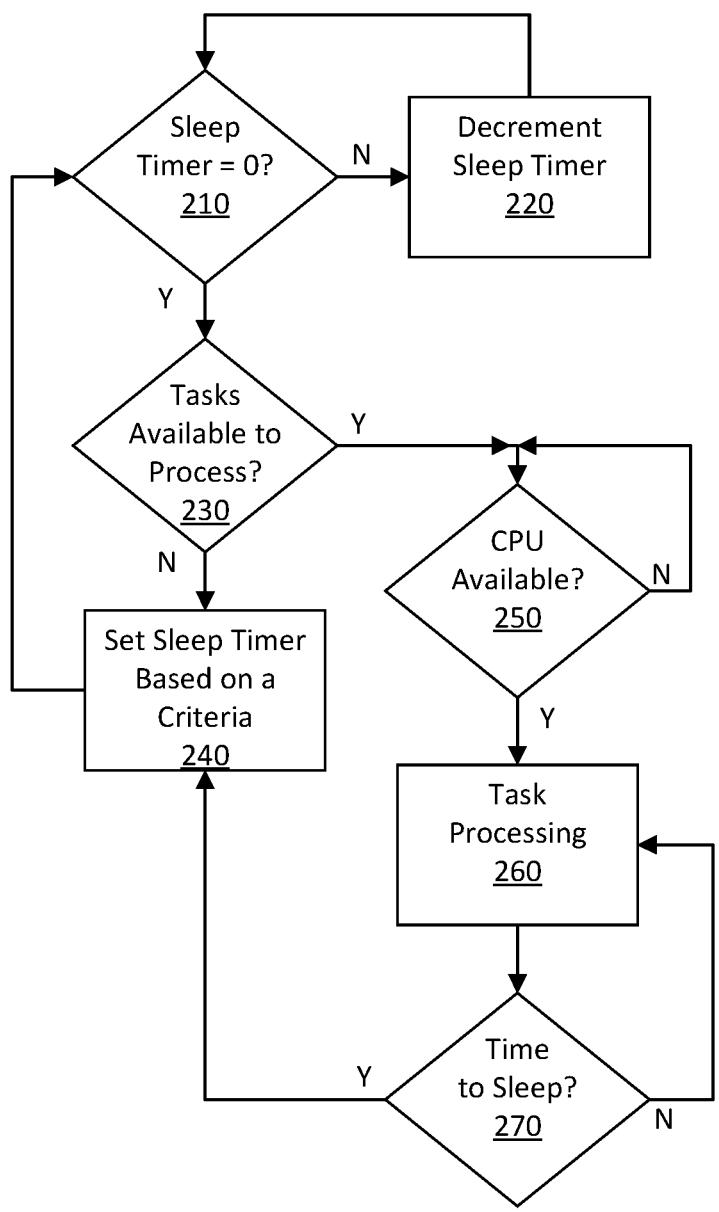
FIG. 2 illustrates a series of steps that may be performed by a set of hardware associated with controlling the operation of a plurality of sets of virtual processes.

FIG. 2 illustrates a series of steps that may be performed by a set of hardware associated with controlling the operation of a plurality of sets of virtual processes. While the steps of FIG. 2 are illustrated as being implemented by a processor executing instructions, these steps may be performed by a set of digital logic or programmable digital logic or a combination of digital logic and operation of instructions executed by a processor.

FIG. 2 begins with determination step 210 that identifies whether a sleep timer associated with a first set of virtual software equals zero, when the sleep timer does not equal zero, program flow moves to step 220, where the sleep timer is decremented. When determination step 210 identifies that the sleep timer is zero, program flow may move to determination step 230 that identifies whether there are processing tasks associated with the first set of virtual software are available to process. When determination step 230 identifies that there are no processing tasks associated with the first set of virtual software available to process, program flow may move to step 240, where the sleep timer associated with the first virtual set of software is set to a value based on a criteria and then program flow may move back to the 210 of FIG. 2. This criteria may be based on historical timing or may be based on a number of processing tasks stored in a processing task queue or buffer.

When determination step 230 identifies that that there are processing tasks associated with the first set of virtual software available to process, program flow may move to step 250 that identifies whether processing hardware (e.g. a central processing unit—CPU) is available to perform processing tasks associated with the first set of virtual software. When the processing hardware is not available, program flow may return to determination step 250. At this time, the processing hardware may not be available because it is being used to process tasks associated with another set of virtual software.

When determination step 250 identifies that the processing hardware is available to process tasks associated with the first set of virtual software, program flow may move to step 260, where tasks associated with the first set of virtual software are processed. After step 260, program flow may move to determination step 270 that identifies whether it is time to pause (sleep) the execution of instructions associated with the first set of virtual software, when no program flow may move back to step 260 of FIG. 2. When determination step 270 identifies that it is time to pause (sleep) the execution of the instructions associated with the first set of virtual software, program flow may move back to step 240, where the sleep timer is set based on the criteria.

Note that processing logic with a set of specific inputs can perform functions consistent with the steps of FIG. 2. For example a logical AND of a set of states identified in table 1 could be used to identify when processing hardware may be available to process tasks associated with a first set of virtual software. Table 1 includes a set of three inputs and an output. Each of the inputs can correspond to a logical value of zero (0) or one (1). Table 1 includes input 1 of "Wake" that identifies whether a particular process is awake or asleep. When "Wake" has a logical value of 0, a corresponding process is asleep and when "Wake" has a logical value of 1, the corresponding process is awake. A process may be awake when a sleep timer of that process is a zero value and when a no-sleep timer of that process is a non-zero value. This process may be asleep when the sleep timer of that process is a non-zero value and when a no-sleep timer of that process is a zero value.

Table 1 also includes input 2 of that indicates whether a processing task is available and an input 3 that indicates whether the processing hardware is available (i.e. not busy performing other tasks) to perform processing tasks. Table 1 also includes an output, when this output has a logical value of 1, the processing hardware may be allowed to process tasks associated with the first set of virtual software. Note that the only time that the processing logic will be allowed to process tasks associated with the first set of virtual software is when each of the input states are in a logical 1 state according to the formula: [(Wake)*(processing task available)*(processing hardware available)]=(output). As such, all of the input states of table 1 must have a logical value of 1 before the processing hardware is allowed to process tasks associated with a specific set of virtual software based on the output state being equal to a logical 1.

Note that the inputs of table 1 may be set or reset based on state information provided via an application program interface that interacts directly with other software that controls the actual physical processing hardware of a computing device, such as a gateway computer, for example.

TABLE 1

First set of Virtual Software Digital Logic Truth Table

| Input 1 Wake | Input 2 Processing Task Available | Input 3 Processing Hardware Available | Output Allow Processing Hardware to Process Tasks |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

Figure 3:
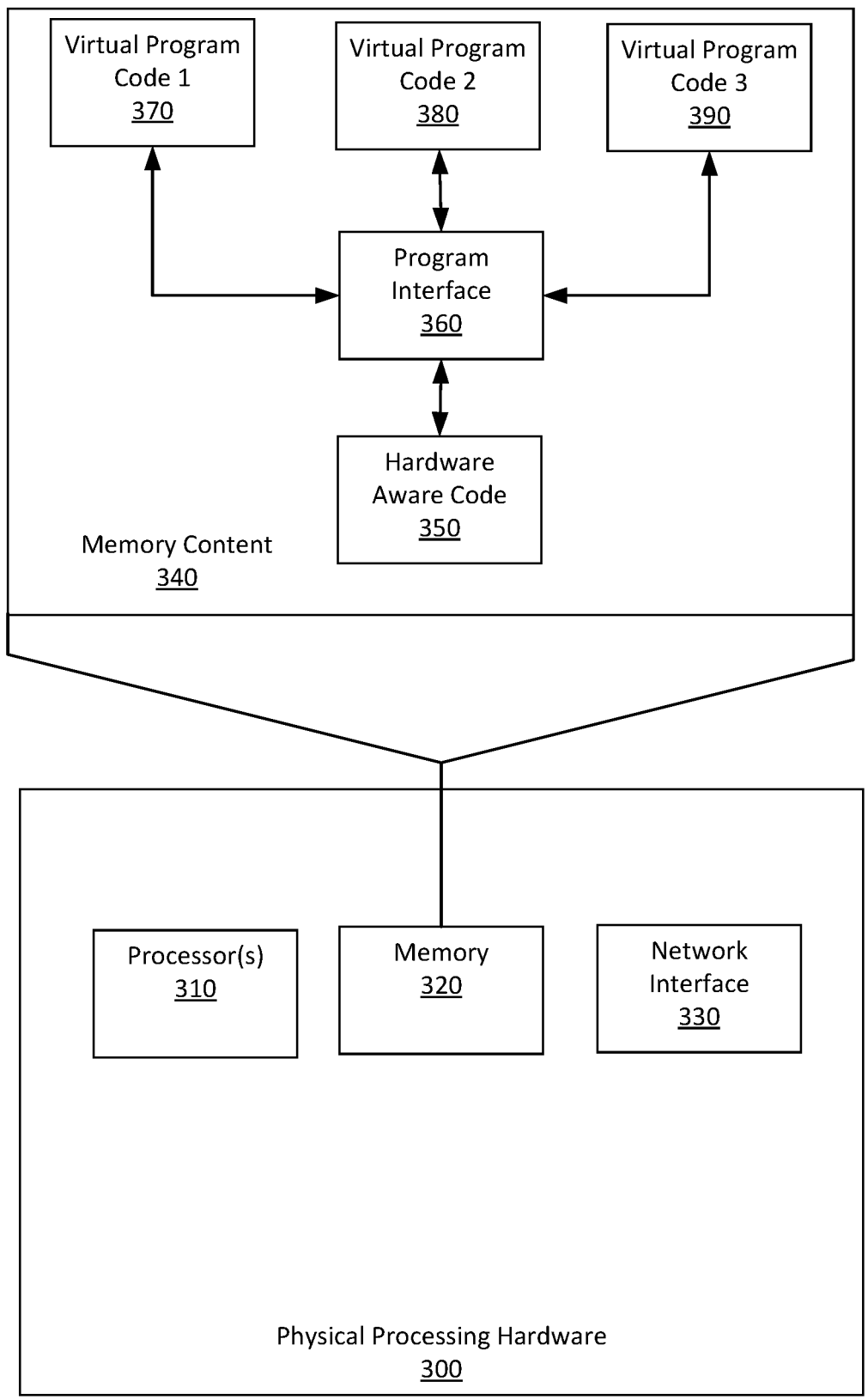
FIG. 3 illustrates a set of physical processing hardware components consistent with the present disclosure and illustrates various sets of program code that may be stored in a memory.

FIG. 3 illustrates a set of physical processing hardware components consistent with the present disclosure and illustrates various sets of program code that may be stored in a memory. The physical processing hardware 300 of FIG. 3 includes processor(s) 310, memory 320, and network interface 330. Content 340 (e.g. respective sets of program code/instructions) stored in memory 320 may include a set of hardware aware program code 350, a program interface 360 set of program code, and three different sets of virtual program code of 370, 380, and 390.

Each set of virtual program code 370, 380, and 390 may share parameters with the hardware aware code 350 by providing data to and receiving data from program interface 360 without any of the sets of virtual program code 370, 380, or 390 being aware of a type of physical processing hardware 300 or a type of processor 310. In certain instances, program interface 360 may be integrated into hardware aware code 350 as a single set of computer program instructions. Program interface 360 may allow compatible software processes to provide data to and to receive data from hardware aware code 350. To accomplish this, data stored in memory 320 may be updated based on data received from a virtual process and operation of processor(s) 310. For example instructions executed by processor(s) 310 may allow data to be provided to one software process to another by updating data or variables stored in memory. This data may be passed through program interface 360 that abstracts the actual physical processing hardware 300 from virtual program code 370, 380, and 390. Using this information processor(s) 310 executing instructions from the hardware aware code 350 may access memory when performing tasks abstractly for a set of virtual program code (370, 380, or 390). The execution of the hardware aware code by the processor(s) 310 may allow data to be provided to the set of virtual program code via program interface 360.

Program interface 360 may be configured to receive information from a virtual process and provide data to a virtual process according to a set of conventions or rules. Table 2 illustrates exemplary data or parameters that may be sent or received by virtual processes. Table 2 includes a number of different identifiers, data, and values that may be set or received by a virtual process. Columns in table 2 include virtual process identifiers, set no-sleep values, receive no-sleep values, receive current times, set last-full times, set sleep timer times, threshold (T-Hold) setting, Process (PCS) task available, and number of processing tasks available. Table 2 identifies three different virtual process identifiers VP1, VP2, and VP2 that may each be associated with settings or values that control how virtual processes operate.

Table 2 indicates that the virtual processes (VP1, VP2, and VP3) may set a no-sleep value, receive a current no-sleep value, receive a current time, set a last-full time, set a sleep timer, set or receive a threshold value, and receive an indication that a virtual processing task is ready for processing (available to process). Parameters that may be received by a virtual processing set of program code may identify a number of processing tasks available for processing. The various types of data included in table 2 may be used when the virtual process of FIG. 1 interacts with other software processes based on operations performed by processor(s) 310 of FIG. 3. Because of this, various types of data set by a virtual process or used by a virtual process may allow the virtual process of FIG. 1 to be implemented on any type of physical processor. In such instances, physical hardware attributes may be abstracted from sets of virtual program code. As such, a virtual process may set a no-sleep value or receive a no-sleep value when operations consistent with FIG. 1 are performed. This virtual process may receive a current time and set a last-full time as discussed in respect to step 175 of FIG. 1, set a sleep timer as in step 115 of FIG. 1, set or receive a threshold setting (e.g. a number of packets threshold), or identify a number of packets that are held in a data packet buffer that are waiting to be processed.

The present disclosure is not limited to passing data as illustrated in table 2 as other data may be set or received by a virtual process. For example, data received by a virtual process may include a no sleep weighting factors (e.g. NS_Wt) of steps 145, 155, 165, or 170 of FIG. 1. Methods consistent with the present disclosure are not limited to data packet processing applications. As such, other types of virtualized processing tasks may be managed according to the present disclosure. For example, when managing the operation of multiple different virtual sets of program applications that may not be related to packet processing.

Figure 4:
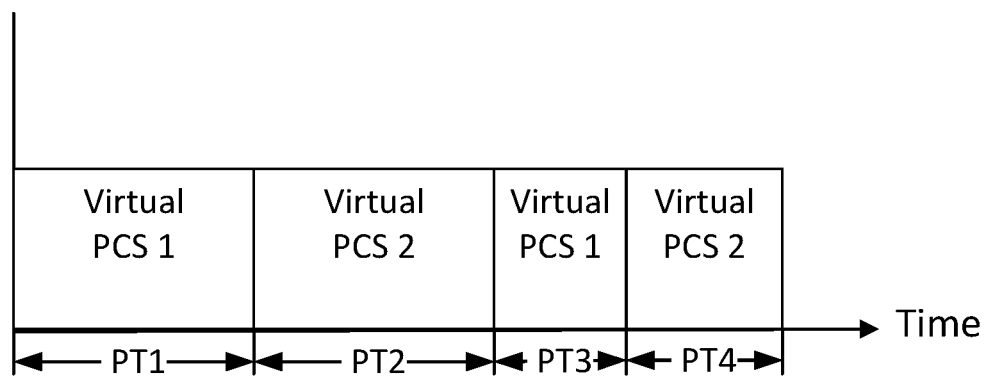
FIG. 4 illustrates times at which instructions from one of two different sets of virtual software are processed at a set of processing hardware over time.

PCS 1) and a second virtual process (virtual PCS 2). Note that processing time frames PT1 & PT3 correspond to times when instructions associated with the first virtual process PCS 1 are executed by processing hardware. Note also that processing time frames PT2 & PT4 correspond to times when instructions associated with the second virtual process PCS 2 are executed by the processing hardware. While FIG. 4 illustrates two different virtual processes PCS 1 & PCS 2, the operation of any number of virtual processes may be managed using methods and apparatus consistent with the present disclosure. In certain instances, each of a set of virtual processes may be interleaved over time. For example, when processing tasks are available for each of three sets of virtual software PCS 1 through a third virtual software process (not illustrated in FIG. 4), each set of virtual software may be allowed to execute according to the sequence of PCS 1, followed by PCS 2, followed by the third virtual software process, and then PCS 1. Times allocated for each respective different processing time window may be based on methods described in respect to FIGS. 1-2 or according to other rules or criteria.

Figure 5:
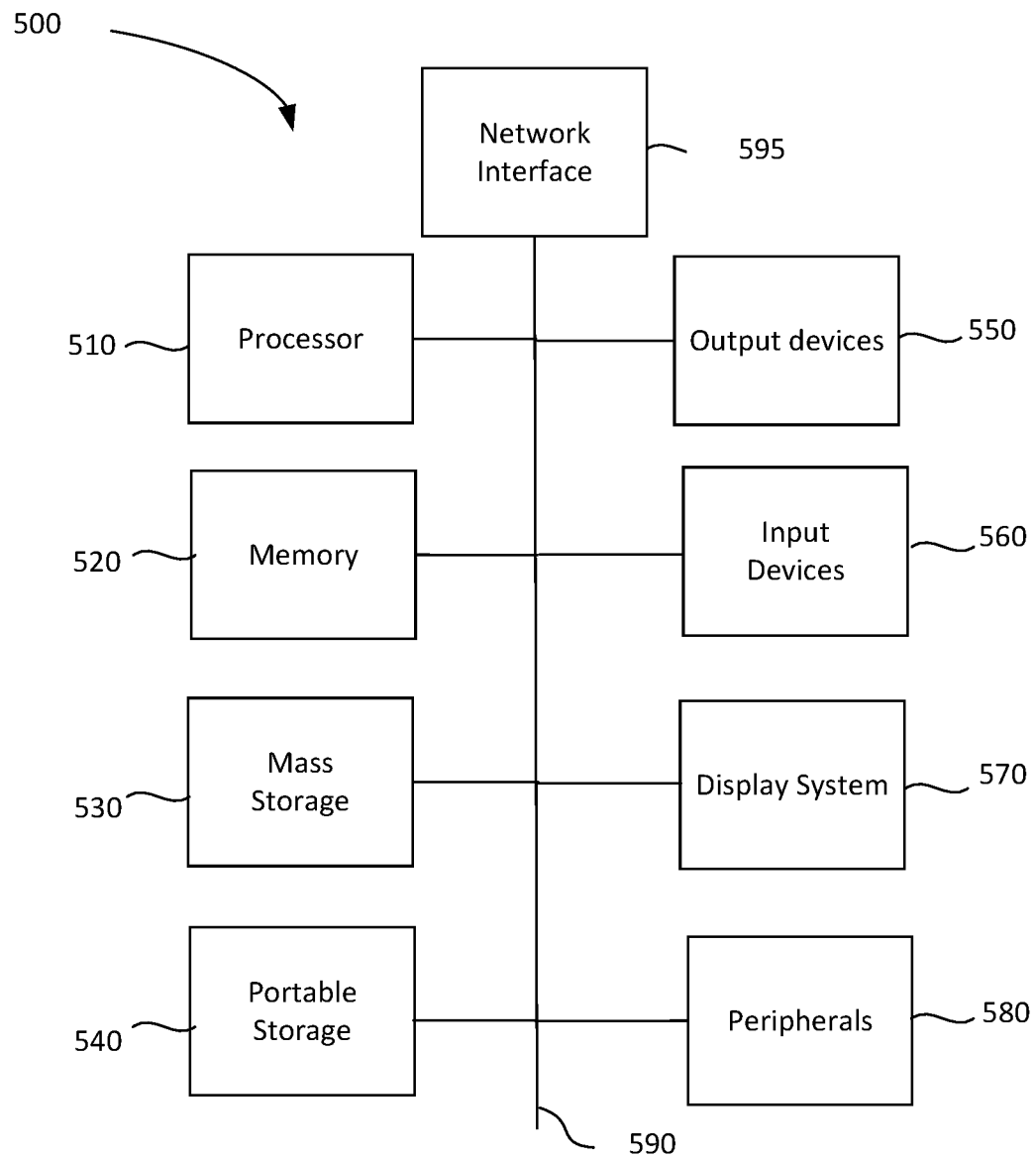
FIG. 5 illustrates a computing system that may be used to implement an embodiment of the present invention.

FIG. 5 illustrates a computing system that may be used to implement an embodiment of the present invention. The computing system 500 of FIG. 5 includes one or more processors 510 and main memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, peripheral devices 580, and network interface 595.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can

TABLE 2

Virtual Process Information

| Virtual Process Identifier | Set No Sleep Value | Receive No Sleep Value | Receive Current Time | Set Last Full | Set Sleep Timer | T-Hold | PCS Task Available | Number of PCS Tasks Available |
|---|---|---|---|---|---|---|---|---|
| VP1 | Set by VP | RCV by VP | RCV by VP | Set by VP | Set by VP | Set-RCV | RCV by VP | RCV by VP |
| VP2 | Set by VP | RCV by VP | RCV by VP | Set by VP | Set by VP | Set-RCV | RCV by VP | RCV by VP |
| VP3 | Set by VP | RCV by VP | RCV by VP | Set by VP | Set by VP | Set-RCV | RCV by VP | RCV by VP |

FIG. 4 illustrates times at which instructions from one of two different sets of virtual software are processed at a set of processing hardware over time. FIG. 4 includes a series of time processing time frames (PT1, PT2, PT3, & PT4), where each different time frame may be of a different duration. FIG. 4 also includes a first virtual process (virtual store the system software for implementing embodiments of the present invention for purposes of loading that software into main memory 520.

Portable storage device 540 operates in conjunction with a portable non-volatile storage medium, such as a FLASH memory, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

Network interface 595 may include any form of computer interface of a computer, whether that be a wired network or a wireless interface. As such, network interface 595 may be an Ethernet network interface, a BlueTooth™ wireless interface, an 802.11 interface, or a cellular phone interface.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 500 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for controlling processing tasks, the method comprising:

setting a first sleep timer to an initial value when a no-sleep variable is determined to be set to a value of zero, the initial value of the first sleep timer identifying a first time that a first virtual process will be paused, wherein a processor executes instructions associated with at least one other process when the first virtual process is paused, and wherein the initial value is set based on a number of processing tasks including the at least one other process to be performed;

executing by the processor instructions associated with the first virtual process after identifying that the first sleep timer corresponds to a zero value;

identifying that the number of processing tasks associated with the first virtual process at least meets a threshold number;

identifying an allocated time for processing one or more processing tasks of the number of processing tasks based on a time difference, wherein the allocated time is greater when the time difference is less than or equal to a first time setting and the allocated time is less when the time difference is greater than the first time setting; and processing the one or more processing tasks for a time span not exceeding the allocated time wherein the allocated time includes a number of iterations that the number of processing tasks is processed.

2. The method of claim 1, further comprising calculating the time difference by subtracting a last time that data packets associated with the first virtual process were processed from a current time.

3. The method of claim 1, further comprising calculating the time difference based on a fill rate of a task buffer.

4. The method of claim 1, wherein the number of processing tasks are associated with processing data packets.

5. The method of claim 1, further comprising:

identifying that a first no-sleep timer corresponds to a non-zero no-sleep time;

identifying that there are no additional processing tasks associated with the first virtual process; and setting the first no-sleep timer to a zero no-sleep time.

6. The method of claim 5, further comprising:
   identifying that the no-sleep time corresponds to the zero no-sleep time; and
   setting the first sleep timer to a default value.

7. The method of claim 6, further comprising identifying that there are additional processing tasks associated with the first virtual process and waking the paused first virtual process.

8. The method of claim 1, further comprising:
   processing data packets associated with a second virtual process when the first virtual process is paused; and
   processing data packets associated with the first virtual process when the second virtual process is paused.

9. The method of claim 1, further comprising:
   receiving a plurality of data packets of the first virtual process when the first virtual process is paused; and
   storing each of the plurality of data packets of the first virtual process in a buffer.

10. The method of claim 1, further comprising identifying that the processor is available to process the instructions associated with the first virtual process.

11. A non-transitory computer-readable storage medium having embodied thereon a program executable by a processor for implementing a method for controlling processing tasks, the method comprising:
    setting a first sleep timer to an initial value when a no-sleep variable is determined to be set to a value of zero, the initial value of the first sleep timer identifying a first time that a first virtual process will be paused, wherein the processor executes instructions associated with at least one other process when the first virtual process is paused, wherein the initial value is set based on a number of processing tasks including the at least one other process to be performed;
    executing by the processor instructions associated with the first virtual process after identifying that the first sleep timer corresponds to a zero value;
    identifying that the number of processing tasks associated with the first virtual process at least meets a threshold number;
    identifying an allocated time for processing one or more processing tasks of the number of processing tasks based on a time difference, wherein the allocated time is greater when the time difference is less than or equal to a first time setting and the allocated time is less when the time difference is greater than the first time setting; and
    processing the one or more processing tasks for a time span not exceeding the allocated time wherein the allocated time includes a number of iterations that the number of processing tasks is processed.

12. The non-transitory computer-readable storage medium of claim 11, the program further executable to calculate the time difference by subtracting a last time that data packets associated with the first virtual process were processed from a current time.

13. The non-transitory computer-readable storage medium of claim 11, the program further executable to calculate the time difference based on a fill rate of a task buffer.

14. The non-transitory computer-readable storage medium of claim 11, wherein the number of processing tasks are associated with processing data packets.

15. The non-transitory computer-readable storage medium of claim 11, the program further executable to:
    identify that a first no-sleep timer corresponds to a non-zero no-sleep time; identify that there are no additional processing tasks associated with the first virtual process; and
    set the first no-sleep timer to a zero no-sleep time.

16. The non-transitory computer-readable storage medium of claim 15, the program further executable to:
    identify that the no-sleep time corresponds to the zero no-sleep time; and
    set the first sleep timer to a default value.

17. The non-transitory computer-readable storage medium of claim 16, the program further executable to:
    identify that there are additional processing tasks associated with the first virtual process; and
    wake the paused first virtual process.

18. The non-transitory computer-readable storage medium of claim 11, the program further executable to:
    process data packets associated with a second virtual process when the first virtual process is paused; and
    process data packets associated with the first virtual process when the second virtual process is paused.

19. The non-transitory computer-readable storage medium of claim 11, the program further executable to:
    receive a plurality of data packets of the first virtual process when the first virtual process is paused; and
    store each of the plurality of data packets of the first virtual process in a buffer.

20. An apparatus for controlling processing tasks, the apparatus comprising:
    a memory; and
    a processor that executes instructions out of the memory to:
        set a first sleep timer to an initial value when a no-sleep variable is determined to be set to a value of zero, the initial value of the first sleep timer identifying a first time that a first virtual process will be paused, wherein the initial value is set based on a number of processing tasks including at least one other process to be performed, wherein the processor executes instructions associated with at least one other process when the first virtual process is paused, identify that the first sleep timer corresponds to a zero value, identify that the number of processing tasks associated with the first virtual process at least meets a threshold number, identify an allocated time for processing one or more processing tasks of the number of processing tasks based on a time difference, wherein the allocated time is greater when the time difference is less than or equal to a first time setting and the allocated time is less when the time difference is greater than the first time setting;
        and process the one or more processing tasks for a time span not exceeding the allocated time, wherein the allocated time includes a number of iterations that the number of processing tasks is processed.

* * * * *